(12) United States Patent
Giardino

(10) Patent No.: US 9,615,052 B2
(45) Date of Patent: Apr. 4, 2017

(54) DEVICE CONFIGURATION USING INTERFERENCE

(71) Applicant: Comcast Cable Communications, LLC, Philadelphia, PA (US)

(72) Inventor: Jason Sydney Giardino, Denver, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 259 days.

(21) Appl. No.: 14/282,752

(22) Filed: May 20, 2014

(65) Prior Publication Data

US 2015/0093999 A1    Apr. 2, 2015

Related U.S. Application Data

(60) Provisional application No. 61/885,259, filed on Oct. 1, 2013.

(51) Int. Cl.
| | |
|---|---|
| *H04N 7/10* | (2006.01) |
| *H04K 3/00* | (2006.01) |
| *H04H 20/00* | (2009.01) |
| *H04N 21/438* | (2011.01) |
| *H04H 20/78* | (2008.01) |
| *H04N 5/50* | (2006.01) |

(52) U.S. Cl.
CPC ............ *H04N 7/102* (2013.01); *H04H 20/00* (2013.01); *H04H 20/78* (2013.01); *H04K 3/00* (2013.01); *H04K 3/62* (2013.01); *H04K 3/65* (2013.01); *H04N 21/4383* (2013.01); *H04N 5/50* (2013.01)

(58) Field of Classification Search
CPC .. H04K 3/00; H04K 3/22; H04K 3/65; H04K 3/62
See application file for complete search history.

(56) References Cited

U.S. PATENT DOCUMENTS

| | | | | |
|---|---|---|---|---|
| 8,543,053 | B1* | 9/2013 | Melamed | H04K 3/43 455/1 |
| 9,179,350 | B2* | 11/2015 | Yao | H04W 72/082 |
| 2004/0014438 | A1* | 1/2004 | Hasarchi | H03H 17/0294 455/119 |
| 2009/0047908 | A1* | 2/2009 | Freundlich | H04N 7/1675 455/66.1 |
| 2010/0130202 | A1* | 5/2010 | Yu | H04W 24/10 455/434 |
| 2010/0302087 | A1* | 12/2010 | Low | H04K 3/42 342/14 |
| 2011/0183602 | A1* | 7/2011 | Tietz | H04K 3/45 455/1 |
| 2014/0206279 | A1* | 7/2014 | Immendorf | H04K 3/40 455/1 |

* cited by examiner

*Primary Examiner* — Brian T Pendleton
*Assistant Examiner* — Frank Johnson-Calderon
(74) *Attorney, Agent, or Firm* — Ballard Spahr LLP

(57) ABSTRACT

Methods and systems for generating and providing signals to a device, and configuring the device are disclosed. An example method can comprise identifying a device tuned to a first frequency, determining a signal configured to provide interference at the first frequency, and providing the signal to the device such that the device is caused to no longer be tuned to the first frequency.

20 Claims, 12 Drawing Sheets

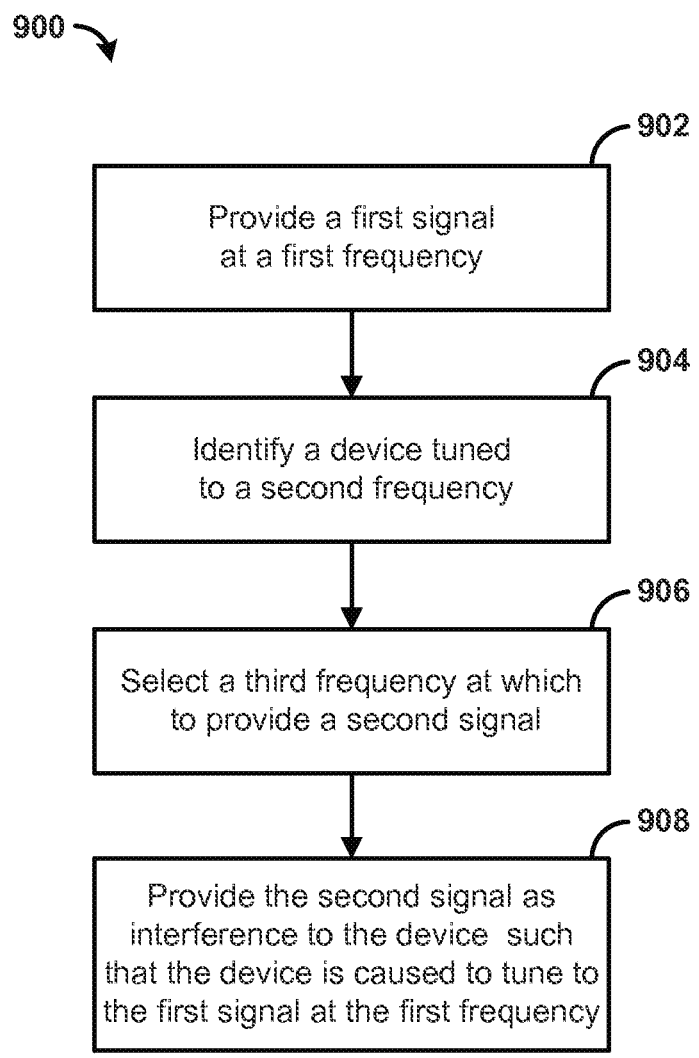

DEVICE CONFIGURATION USING INTERFERENCE

CROSS REFERENCE TO RELATED PATENT APPLICATION

This application claims priority to U.S. Provisional Application No. 61/885,259 filed Oct. 1, 2013, herein incorporated by reference in its entirety.

BACKGROUND

Information can be provided through networks to a variety of devices. Some devices may receive information by tuning to a signal at a particular frequency. Occasionally, a device can tune to an incorrect frequency, preventing the device from receiving the information at another frequency. The provider of the information, however, may have limited or no access to reconfigure the device. Thus, there is a need for more sophisticated methods and systems for configuring devices to properly tune to, or prevent from tuning to, certain information signals.

SUMMARY

It is to be understood that both the following general description and the following detailed description are exemplary and explanatory only and are not restrictive, as claimed. In some aspects, methods and systems for configuring a device are disclosed. An example method can comprise identifying a device tuned to a first frequency, determining a first signal configured to provide interference at the first frequency, and providing the first signal to the device such that the device is caused to no longer be tuned to the first frequency (e.g., or cause the device to be tuned to the first frequency with interference).

In another aspect, an example method can comprise providing a first portion of a first signal (e.g., centered) at a first frequency. A second portion of the first signal can be provided at a second frequency. A device locked to the second frequency can be detected, and a second signal configured to provide interference at the second frequency can be determined. The second signal can be provided such that the device releases the lock from, or can no longer lock onto or process, the second frequency.

In another aspect, an example method can comprise providing a first signal (e.g., centered and/or a portion thereof) at a first frequency. A portion of the first signal can be provided at a second frequency. A second signal can be provided as interference to a device tuned to the second frequency such that the device is caused to tune to the first signal at the first frequency.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 9 is a flowchart illustrating yet another example method for providing signals to a device.

DETAILED DESCRIPTION

Figure 1:
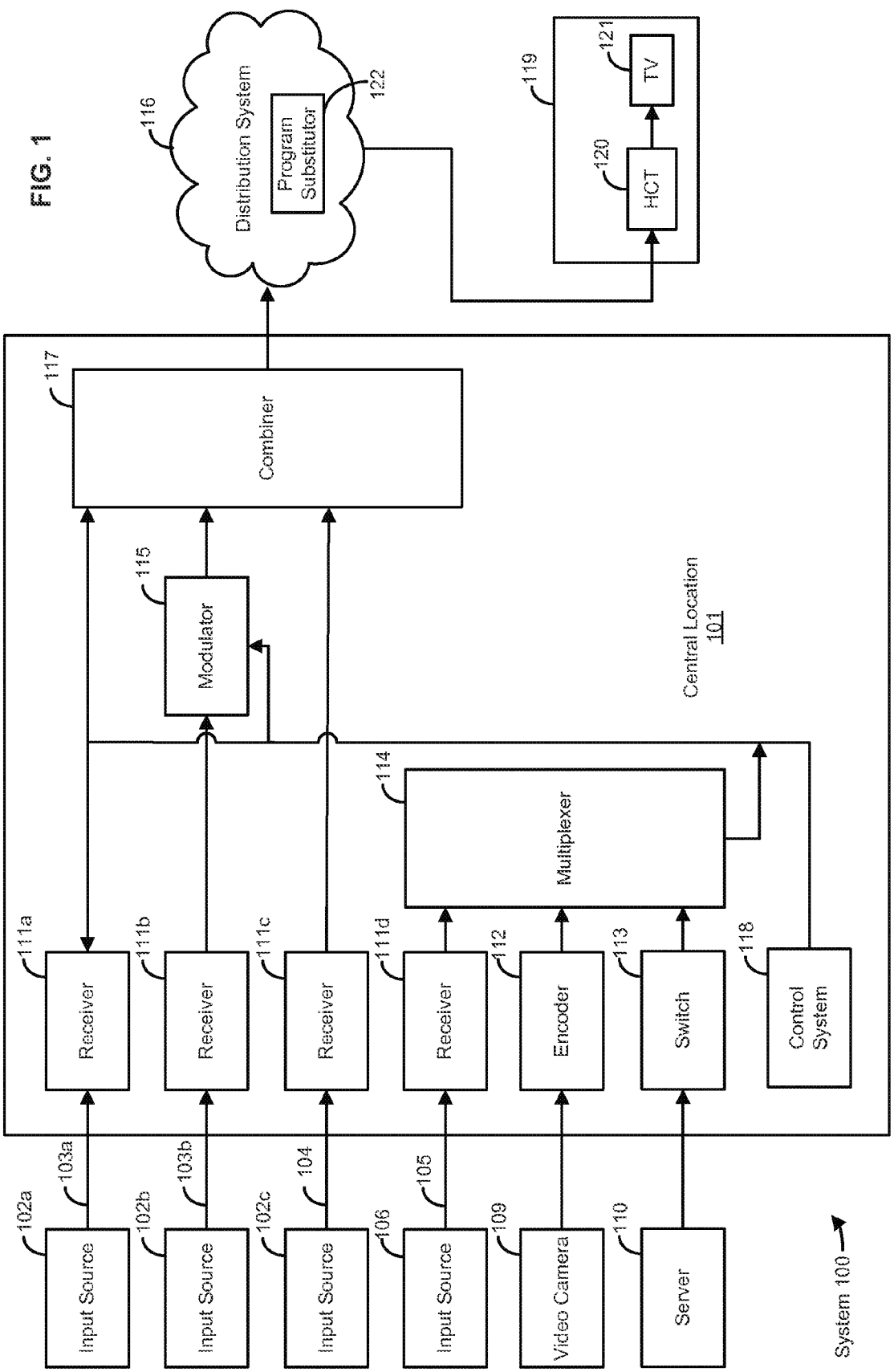
FIG. 1 is a block diagram illustrating various aspects of an example system in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to methods and systems for providing signals to and/or configuring a device. For example, the device can comprise a network device, such as a modem, set-top box, digital receiver, and the like. In an aspect, the device can be susceptible to an incorrect tuning lock. For example, the device can be susceptible to an incorrect tuning lock on a side lobe of a data signal. In another aspect, it may be desirable to interfere with a tuning lock for other maintenance and/or emergency purposes. For example, a tuning lock can occur when the device determines to remain tuned to a frequency instead of scanning frequencies for a desired frequency and/or signal. In such case, the device can enable a tuning lock mode in which the device is programmed to function under an assumption that the device is properly tuned to a desired frequency (e.g., a frequency with a data signal relevant to the device). In some scenarios, the device may remain tuned to a frequency in a manner that prevents communication to the device or delivers incorrect or undesired information, and the like. As an illustration, a data signal can be centered at a first frequency, and a side lobe of the data signal can be provided at a second frequency. In one aspect, the side lobe can comprise an edge of a data signal that does not maintain the signal strength and/or data transferring characteristics of the main lobe. An incorrectly tuned device can be detected, for example, by the determining if the device is unresponsive to the data signal or other signal. An interference signal can be identified, selected, and/or generated. For example, one or more of an amplitude, waveform, signal width, and frequency for the interference signal can be determined. In one aspect, the interference signal can be provided to interfere with a main lobe and/or side lobe of another signal. For example, the interference signal can be provided such that interference is provided at the side lobe of the data signal without disrupting data provided at the first frequency. For example, the interference signal can be provided at an offset to the side lobe. In other scenarios, the interference signal can be selected and provided to interfere with the main lobe of a data signal. The interference signal can be provided until the device disables the tuning lock. The device can then begin scanning other frequencies to find a different data signal. The device can also provide an error message indicating that a data signal (e.g., content channel) is unavailable. As a further example, the device can find the first frequency (e.g., where the main lobe of a data signal is centered) and correctly enable a tuning lock at the first frequency.

FIG. 1 illustrates various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

The system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Other input sources can comprise capture devices, such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders, such as encoder 112, are included for encoding local content or a video camera 109 feed. A switch 113 can provide access to server 110, which can be a Pay-Per-View server, a data server, an internet router, a network system, a phone system, and the like. Some signals may require additional processing, such as signal multiplexing, prior to being modulated. Such multiplexing can be performed by multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117 for input into the distribution system 116.

A control system 118 can permit a system operator to control and monitor the functions and performance of system 100. The control system 118 can interface, monitor, and/or control a variety of functions, including, but not limited to, the channel lineup for the television system, billing for each user, conditional access for content distributed to users, and the like. Control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or home communications terminal (HCT) can decode, if needed, the signals for display on a display device, such as on a television set (TV) 121 or a computer monitor. Those skilled in the art will appreciate that the signal can be decoded in a variety of equipment, including an HCT, a computer, a TV, a monitor, or a satellite dish. In an exemplary aspect, the methods and systems disclosed can be located within, or be performed on, one or more HCT's 120, TV's 121, central locations 101, DVR's, home theater PC's, and the like.

In an aspect, user location 119 is not fixed. By way of example, a user can receive content from the distribution system 116 on a mobile device, such as a laptop computer, a PDA, a smartphone, GPS, a vehicle entertainment system, a portable media player, and the like.

In an exemplary embodiment, the methods and systems disclosed can be located within one or more modulators 115. For example, the modulator can be configured to provide an interference signal. The modulator 115 can receive the interference signal or an instruction to provide the interference signal from a receiver 111, the control system 118, or other device at the central location 101. The modulator 115, control system 118, input source 102, or other device can determine the signal width, the amplitude, the waveform, and the frequency of the interference signal. In another aspect, other devices located at the central location 101, within the distribution system 116, and/or at the user location 119 can be utilized to provide an interference signal.

In an aspect, the methods and systems can utilize digital audio/video compression, such as MPEG or any other type of compression. The Moving Pictures Experts Group (MPEG) was established by the International Standards Organization (ISO) for the purpose of creating standards for digital audio/video compression. The MPEG experts created the MPEG-1 and MPEG-2 standards, with the MPEG-1 standard being a subset of the MPEG-2 standard. The combined MPEG-1, MPEG-2, and MPEG-4 standards are hereinafter referred to as MPEG. In an MPEG encoded transmission, content and other data are transmitted in packets, which collectively make up a transport stream. In an exemplary embodiment, the present methods and systems can employ transmission of MPEG packets. However, the present methods and systems are not so limited, and can be implemented using other types of transmission and data.

Figure 2:
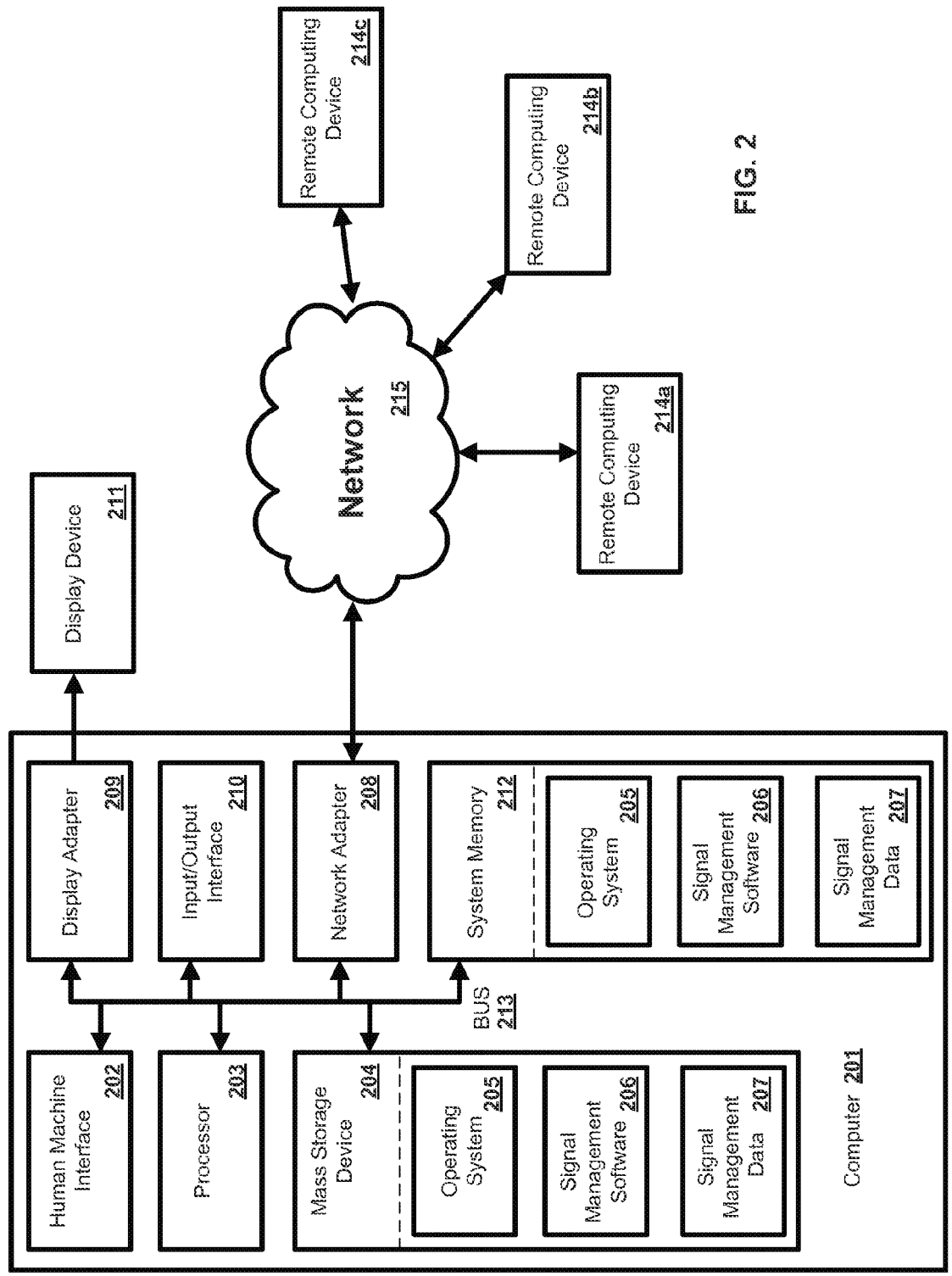
FIG. 2 is a block diagram illustrating an example computing system in which the present methods and systems can operate.

In an exemplary aspect, the methods and systems can be implemented on a computer 201, as illustrated in FIG. 2 and described below. By way of example, first device 302, second device 310, and/or third device 314 of FIG. 3 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set-top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 201. The components of the computer 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, signal management software 206, signal management data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computer 201 typically comprises a variety of computer readable media. Exemplary readable media can be any available media that is accessible by the computer 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data, such as signal management data 207, and/or program modules, such as operating system 205 and signal management software 206, that are immediately accessible to and/or are presently operated on by the processing unit 203.

In another aspect, the computer 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computer 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and signal management software 206. Each of the operating system 205 and signal management software 206 (or some combination thereof) can comprise elements of the programming and the signal management software 206. Signal management data 207 can also be stored on the mass storage device 204. Signal management data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like. These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computer 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computer 201 via Input/Output Interface 210. Any step and/or result of the methods can be output in any form to an output device. Such output can be any form of visual representation, including, but not limited to, textual, graphical, animation, audio, tactile, and the like. The display 211 and computer 201 can be part of one device, or separate devices.

The computer 201 can operate in a networked environment using logical connections to one or more remote computing devices 214a,b,c. By way of example, a remote computing device can be a personal computer, portable computer, smartphone, a server, a router, a network computer, a peer device or other common network node, and so on. Logical connections between the computer 201 and a remote computing device 214a,b,c can be made via a network 215, such as a local area network (LAN) and/or a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 205, are illustrated herein as discrete blocks, although it is recognized that such programs and components reside at various times in different storage components of the computing device 201, and are executed by the data processor(s) of the computer. An implementation of signal management software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques, such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 3:
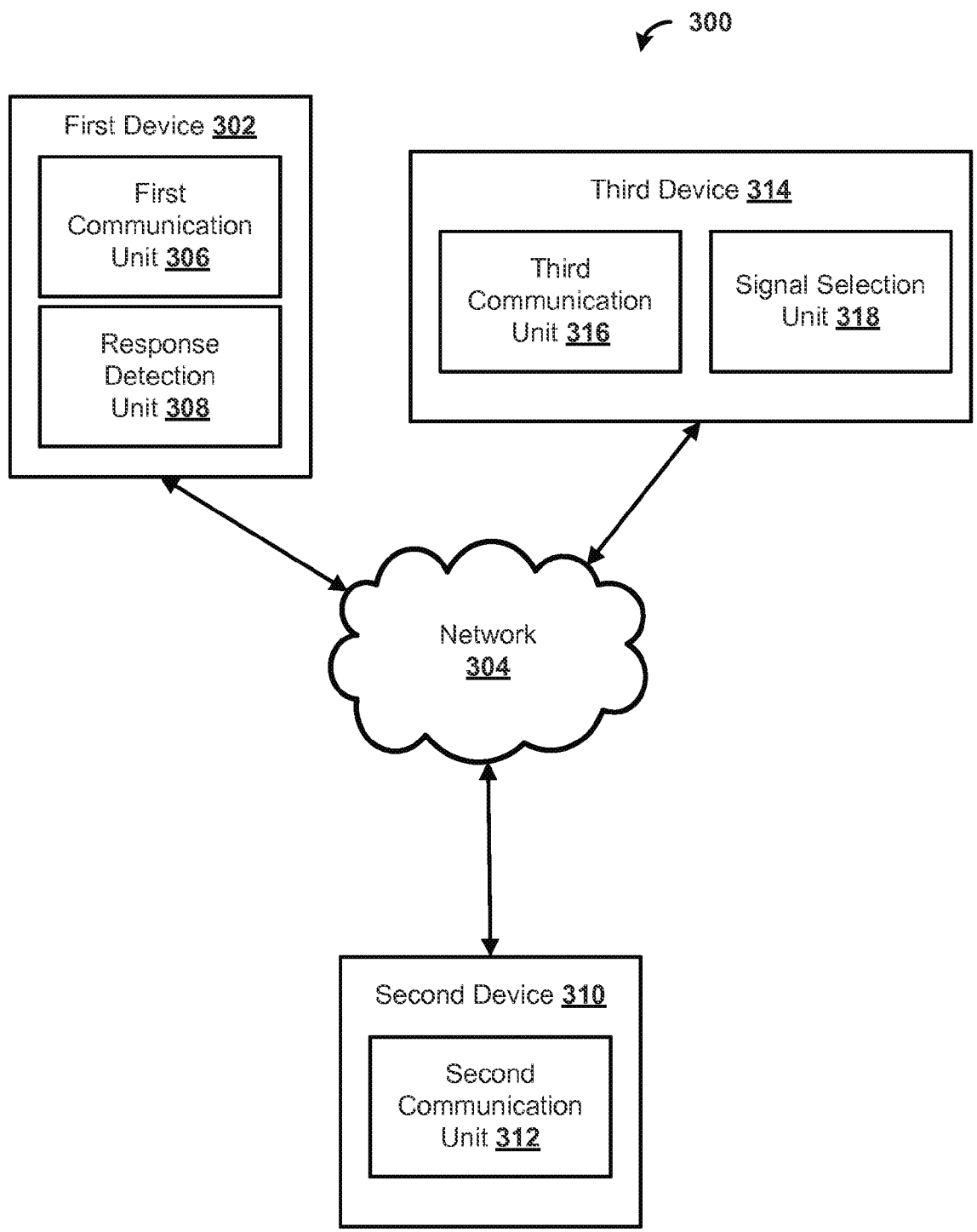
FIG. 3 is a block diagram of an example system in accordance with the present methods and systems.

FIG. 3 is a block diagram of an example system 300 in accordance with the present methods and systems. In one aspect, the system 300 can comprise a first device 302 connected to a network 304. In one aspect, the network 304 can comprise a content distribution network and/or content access network. For example, the network can comprise wireless (e.g., 3G, 4G, WIFI) network links and/or wired network links (e.g., fiber optic cable, coaxial cable, or a combination thereof) configured to provide content at different frequency allocations. In one aspect, the network 304 can comprise a cable television distribution network and/or cable television access network.

In one aspect, the first device 302 can be a device located at the central location 101 and/or the distribution system 116 of FIG. 1. In one aspect, the first device 302 can comprise a first communication unit 306. The first communication unit 306 can be configured to provide information across the network 304. Information can comprise, for example, content (e.g., text, audio, images, video, data), related metadata, and/or control data. The first communication unit 306 can provide the information over the network 304 as a signal on an in-band frequency and/or as a signal on an out-of-band frequency. For example, all or part of the information can be provided at one or more frequencies allocated for certain types of information (e.g., content). Additional information can be provided at one or more frequencies designated for other types of information (e.g., metadata, control information). As an illustration, in-band frequencies can comprise frequencies designated for the communication of audio and video, and, in some cases, signaling and control data. Out-of-band frequencies can comprise frequencies designated for communication of text, control signals, electronic program guide data, video on demand information and other information related to the audio and/or video provided at the in-band frequencies or other services available to a receiving device. In one aspect, out-of-band frequencies can comprise standardized out-of-band frequencies, such as: 75.25 MHz, 104.20 MHz, 72.75 MHz, 92.25 MHz, 98.25 MHz, 107.25 MHz, 107.40 MHz, 110.25 MHz, 116.25 MHz, 103.75 MHz, and the like. In another aspect, in-band frequencies can comprise channels (e.g., ranges of frequencies) standardized by the Electronic Industries Association (EIA). It should be noted, however, that other frequencies can be used for in-band and out-of-band frequencies.

In one aspect, the first device 302 can comprise a response detection unit 308 configured to detect a response from a remote device (e.g., a device connected to the network 304, such as the second device 310 or third device 314). For example, the response detection unit 308 can be configured to provide a signal to the remote device. The signal can comprise a request for a response from the remote device. As an example, the request can comprise a "refresh" operation. In the refresh operation, a channel map, authorizations, and configuration information can be sent to the second device 310. In response, the second device 310 can send back an acknowledgement that it received the refresh message. As another example, the request can comprise a polling request. In response to the polling request, the second device 310 can send data, such as diagnostic information or impulse pay-per-view purchases stored on the second device 310. As another example, the request can comprise a request to assign the second device 310 an IP address on the interactive network. In response to the request to assign the IP address, the second device 310 can provide one or more acknowledgments of the request.

If no response to the request is received (e.g., by the first device 302 or other device), then the response detection unit 308 can provide a notification indicating that no response was received from the remote device. The notification can be provided to a user, such as a system administrator or technician. In another aspect, the notification can be provided to a remote device, such as the third device 314.

In one aspect, the system 300 can comprise a second device 310. In one aspect, the second device 310 can be a device located at the user location 119 of FIG. 1. In one aspect, the second device 310 can be configured to receive information from the first device 302. For example, the second device 310 can be communicatively coupled to the first device 302 through the network 304. In one aspect, the second device 310 can comprise a user device, such as a set-top box, a digital media device, a television, a mobile device (e.g., smart phone, watch, glasses), a tablet device, a laptop device, a computing station, and the like. For example, the second device 310 can comprise a set-top box configured to receive audio and video by tuning to channels provided on a variety of frequencies. The channels can be received by tuning into one or more in-band frequencies, such as a range of frequencies. For example, in-band frequencies can be allocated according to 6 MHz allocations comprising one or more channels. In another aspect, the out-of-band frequencies can be allocated according to 1.5 MHz allocations. Data received at out-of-band frequencies can comprise, for example, electronic program guide data, authorization data, hardware and/or software control signals, video on-demand data, and the like.

In one aspect, the second device 310 can comprise a second communication unit 312 configured to manage communication between the second device 310 and other devices on the network 304. In one aspect, the second communication unit 312 can comprise a tuner configured to tune to one or more frequencies to receive information from signals provided at the one or more frequencies. The second communication unit 312 can be configured to search for signals at one or more frequencies. For example, the second communication unit 312 can be configured to search for out-of-band signals at one or more of the following example frequencies: 75.25 MHz, 104.20 MHz, 72.75 MHz, 92.25 MHz, 98.25 MHz, 107.25 MHz, 107.40 MHz, 110.25 MHz, 116.25 MHz, and 103.75 MHz.

In one aspect, the second communication unit 312 can be configured to identify a signal at one or more frequencies. For example, the second communication unit 312 can cycle through a list of frequencies (e.g., the example frequencies listed above) until a signal is identified (e.g., detected). As an illustration, the second device 310 can comprise a pre-programmed list of out-of-band frequencies. As another illustration, the second device 310 can receive a list of in-band frequencies (e.g., a channel map) through an in-band data signal. In one aspect, a signal can be identified based on a regular pattern of the signal (e.g., sine wave, square wave), signal strength (e.g., amplitude of a signal wave), and the like. For example, the signal can comprise a carrier lock signal configured to identify the signal as a data carrying signal.

In one aspect, the second communication unit 312 can enable a tuning lock at one or more frequencies. For example, after the second communication unit 312 has identified a signal at one or more frequencies, then the second communication unit 312 can enable a tuning lock. With the tuning lock enabled, the second communication unit 312 can be configured to remain tuned to one or more frequencies. For example, with tuning lock enabled, the second communication unit 312 can be configured to no longer search for signals at other frequencies.

Figure 4A:
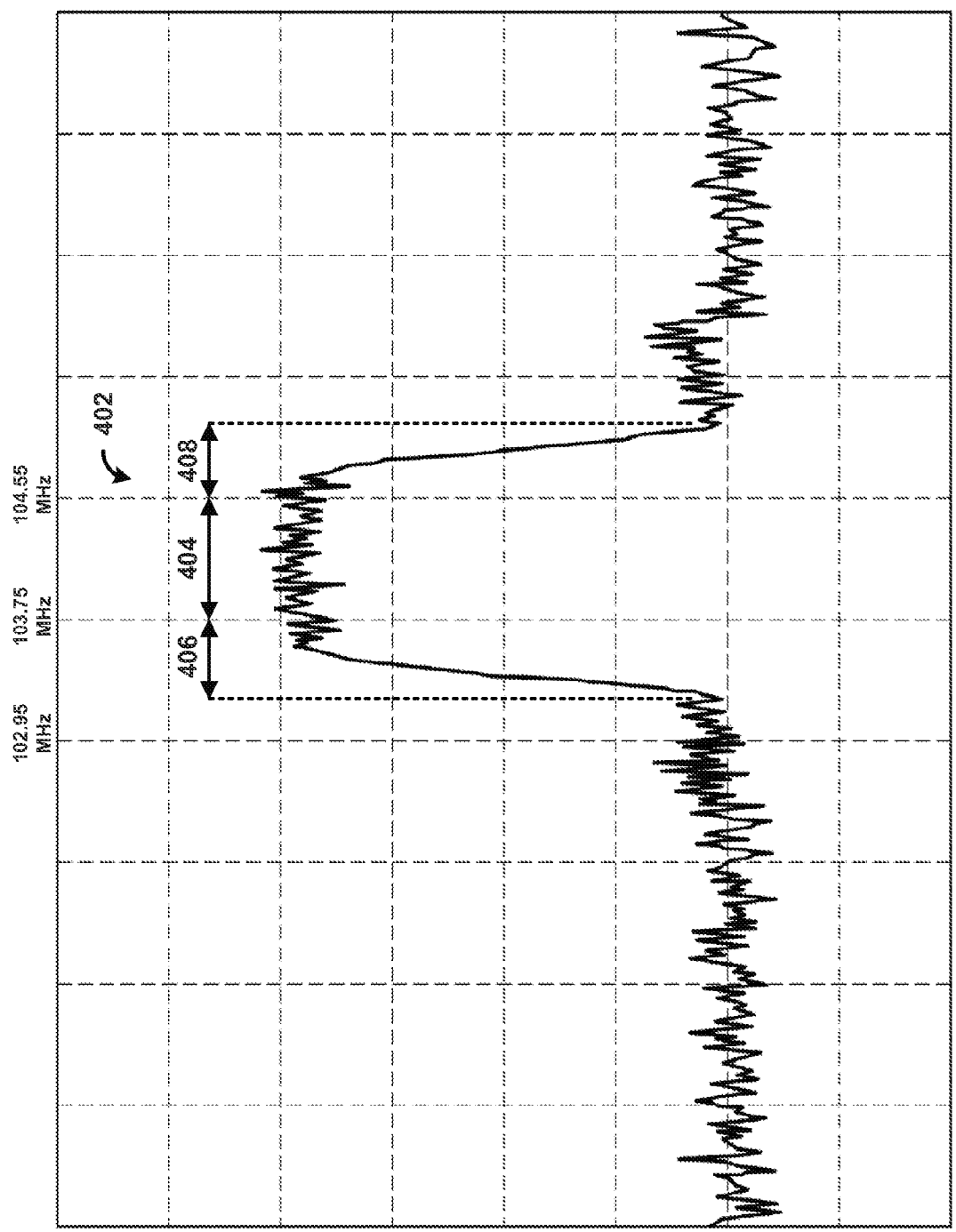
FIG. 4A is a graph illustrating an example signal provided to a device.

In one aspect, the system 300 can comprise a third device 314. In one aspect, the third device 314 can be a device located at the central location 101 and/or the distribution system 116 of FIG. 1. The third device 314 can be configured to provide signals to one more remote devices, such as the second device 310. For example, the third device 314 can comprise a third communication unit 316 configured to provide signals through network 304. In one aspect, the third communication unit 316 can comprise one or more modulator, encoder, server, and/or other network device. As an example, the third communication unit 316 can be configured to provide a modulated signal based on quadrature amplitude modulation, quadrature phase shift keying, and/or any other modulation techniques. The third communication unit 316 can provide the signal at one or more frequencies. For example, a signal can comprise a main lobe centered at a first frequency. The first frequency can be a frequency intended for transmission of data. The main lobe can comprise the strongest (e.g., greatest amplitude) component of the signal. The signal can also comprise one or more side lobes. FIG. 4A illustrates a main lobe and side lobes of an example signal. The side lobe can comprise one or more components of the signal weaker than the main lobe. In some scenarios, the side lobes may be unsuitable for data transmission.

The third device 314 can comprise a signal selection unit 318 configured to select (e.g., determine, identify) signals (e.g., or parameters thereof) for transmission by the third communication unit 316. In one aspect, the signal selection unit 318 can be configured to select a signal configured to provide interference with another signal received at the second device 310. For example, the signal selection unit 318 can be configured to select a signal configured to provide interference to a signal provided by the first device 302 to the second device 310. In some scenarios, the second communication unit 312 of the second device 310 can be tuned to a an undesired frequency. For example, the second communication unit 312 can have a tuning lock on a frequency at which data is currently not being transmitted or at which a portion of that data is not discernable. For example, the second communications unit 312 can have a tuning lock on a side lobe of a data signal.

As an illustration, a first signal can be received by the second device 310 at a first frequency. The main lobe of the first signal can be provided to the second device 310 at the first frequency. Additional components of the signal can be provided on other frequencies. For example, a side lobe of the signal can be provided on a second frequency. When the second device 310 is searching for signals at various frequencies, the second device 310 can lock on a frequency at which a side lobe of a data signal is provided. As an example, the first signal can be provided at a first frequency (e.g., 104.20 MHz). The second device 310 can search for a signal at a second frequency (e.g., 103.75 MHz). In one scenario, the second device 310 can detect a side lobe of the first signal at the second frequency. Accordingly, the second device 310 can enable a tuning lock at the second frequency. Since the second device 310 has a tuning lock on a side lobe of the signal, the second device 310 may be unable to identify (e.g., determine, read, receive) data transmitted at the main lobe of the signal. Accordingly, the second device 310 may be unresponsive to notification, signals, data, and/or the like transmitted through the signal at the first frequency. In such scenario, a remote user (e.g., at the first device 302) may be unable to communicate with the second device 310 based on the first signal.

In one aspect, the signal selection unit 318 can be configured to select a second signal to provide interference to at least a part of a first signal. For example the first signal can comprise a signal provided by the first device 302. The first signal can comprise a data signal. As an example, the first signal can comprise a main lobe in which information (e.g., data, notifications, signals, and the like) is provided at a first frequency. The first signal can comprise one or more side lobes provided at other frequencies, such as a second frequency. In one aspect, the signal selection unit 318 can identify a signal frequency, signal amplitude, signal waveform, and the like for the second signal. The frequency of the second signal can be based on the frequency of the first signal. For example, the signal selection unit 318 can identify a frequency offset from the frequency of the first signal. The frequency of the second signal can be selected by adding or subtracting the frequency offset from the frequency of the first signal. As another example, the signal selection unit 318 can identify a frequency of the first signal based on a predefined frequency. For example, the signal selection unit 318 can comprise a table of signal frequencies. The table of signal frequencies can list a variety of frequencies at which to provide interference. The signal selection unit 318 can select one or more of the frequencies from the table. The frequencies in the table can be associated with data signals with which to provide interference. The signal selection unit 318 can select the second frequency from the table based on a data signal (e.g., or frequency thereof) in the table. For example, the data signal can be a signal (e.g., main lobe and/or side lobe) to which the second device is incorrectly tuned. Additionally, the signal selection unit 318 can select amplitudes, waveforms, and/or other signal parameters based on offsets and/or other predefined information located in one or more tables or received from other devices (e.g., the first device 302).

In one aspect, the signal selection unit 318 can receive a notification from the first device 302 indicating information about the first signal. For example, the notification can comprise an amplitude of the first signal, a center frequency of the first signal, at least a portion of a waveform of the first signal, and the like. The notification can also indicate that the second device 310 is unresponsive to the first signal. In one aspect, the signal selection unit 318 can select the second frequency, the amplitude of the second signal, the waveform of the second signal, and the like parameters of the second signal based on information about the first signal received in the notification. For example, the signal selection unit 318 can perform one or more calculations, comparisons, and/or other evaluations based on the information about the first signal.

As an illustration, the signal selection unit 318 can determine a target interference signal. In one aspect, the target interference signal can comprise a target signal amplitude at one or more target signal frequencies. In one aspect, the signal selection unit 318 can determine one or more service disruption factors. For example, one or more signals (e.g., data signals) that might be disrupted by the interference signal can be determined. The one or more disrupted signals can be determined based on proximity in frequency to the interference signal. In one aspect, the target interference signal can be selected such that the interference does not disrupt data transmission. For example, the interference signal can be selected to provide interference at a side lobe of a data signal without disrupting data transmission at the main lobe (e.g., center frequency) of the data signal. In another aspect, the interference signal can be selected such that the level of interference at a desired frequency (e.g., a side lobe frequency of a data signal) is sufficient to cause a device release a signal lock (e.g., disable signal lock mode). In one aspect, the interference signal can be selected such that the interference signal is offset from the side lobe of a data signal by an amount sufficient to cause interference at the side lobe of the data signal without disrupting the transmission of data on the main lobe of the data signal.

As an illustration, an out-of-band data signal can be provided to the second device 310. The data signal can be centered at 104.20 MHz (e.g., the main lobe). The data signal can also comprise a side lobe provided at 103.75 MHz. In one scenario, the second device 310 can incorrectly enable a tuning lock mode, thereby locking the tuner at 103.75 MHz. An interference signal can be provided to the second device 310. In one aspect, the interference signal can be offset from the side lobe frequency by 0.75 MHz. For example, the interference signal can be centered at 103.00 MHz.

As another illustration, one or more in-band data signals can be provided to the second device 310. In one aspect, the second device 310 can be incorrectly tuned to a frequency. For example, the second device 310 can be tuned to a signal noise, random noise, and the like. As another example, the second device 310 can be tuned to a data signal, such as a channel defined by the Electronic Industries Association (EIA). In some scenarios, it can be desirable to cause the second device 310 to lose tuning lock on the in-band signal and/or cause the second device 310 to tune to another signal. For example, the second device 310 can be tuned to a frequency of the in-band data signal other than the center frequency of the in-band data signal. As another example, the second device 310 can be tuned to a frequency at which a signal is currently and/or temporarily not used for a data signal or used for a data signal other than the data signal expected by the second device 310.

As a further illustration, the second device 310 can be properly tuned to a signal but for a variety of reasons, it can be desirable to cause the second device 310 to drop the signal. For example, the signal can comprise incorrect content, inappropriate content, signal distortions, and the like. While the source of the problem is resolved, it may be desirable to prevent the second device 310 from locking on to the content. In the case of a cable delivery system, a technician might not have quick access to the software system to disable or re-route the routing of this signal. If the technician were to physically unplug the cable from a modulator, such as an APEX, the cable could be carrying eight EIA QAM channels, which can comprise, for example, anywhere from 16 to 128 services (e.g., depending on if they are SD, HD, or music services) that could be lost if the cable was pulled. The technician could use the present methods and systems to introduce interference on the in-band frequency, causing the services on that one frequency (e.g., 2 or 3 services for HD, 12 to 16 services for SD) to go out, but leaving the other services and frequencies intact. Thus, while an interference signal is provided, customer devices (e.g., the second device 310) will be unable to view the original signal while the cable service provider resolves the problem with the original signal.

In another aspect, the signal selection unit 318 can select the second frequency, the amplitude of the second signal, the waveform of the second signal, and the like parameters of the second signal based on input of a user of the first device 302 and/or third device 314. For example, the first device 302 and/or the third device 314 can comprise a digital and/or analog user control element for selecting a frequency, an amplitude, waveforms, and/or the like signal parameters. If the user input is provided at the first device 302, the user input can be provided to the third device 314 in the notification to the third device 314.

In an aspect, the third communication unit 316 can be configured to generate and provide the second signal selected by the signal selection unit 318. As an example, the third communication unit 316 can provide the second signal to the second device 310. The second signal can be provided at one or more frequencies to the second device 310. In one aspect, the second signal can be provided such that the second device 310 is caused to no longer be tuned to a particular frequency. For example, the second signal can interfere with a portion of the first signal (e.g., a side lobe of the first signal). In one aspect, a portion of the second signal can interfere with a portion of the first signal. For example, the third communication unit 316 can provide the second signal such that a side lobe of the second signal interferes with a side lobe of the first signal. As an illustration, a main portion (e.g., main lobe) of the first signal can be provided at a first frequency. An additional portion of the first signal can be provided at a second frequency. The third device 314 can provide a main portion (e.g., main lobe) of the second signal at a third frequency. The third device 314 can provide an additional portion of the second signal at the second frequency. In one aspect, the additional portion of the second signal can interfere with the additional portion of the first signal.

In one aspect, the third communication unit 316 can be configured to provide the second signal to the second device 310 based on a time constraint. For example, the second signal can be provided until a default amount of time has expired. As another example, the second signal can be provided until the second device 310 is caused to no longer tune to the second frequency.

In one aspect, the third communication unit 316 can be configured to modify the second signal. As an illustration, if a specified amount of time of providing the second signal passes without causing the second device 310 to no longer tune to the second frequency, then the third communication unit 316 can modify the second signal. As another illustration, if disruption of data communication in the first signal is detected, the second signal can be modified. For example, the amplitude of the second signal can be increased or decreased. The range of frequencies at which the second signal is provided can be increased or decrease. As another example, the waveform of the second signal can be modified (e.g., changed to a non-data carrying signal or a different non-data carrying signal, or changed to a noise signal).

In response to the interference, the second device 310 can be configured to disable (e.g., release) a tuning lock on the second frequency, enter into a signal search mode to search for signals at various frequencies, tune to another frequency, stop tuning to the second frequency, and/or the like. For example, the second device 310 can search for a signal until the second device identifies another signal, such as the first signal at the first frequency. When another signal is found, the second device 310 can be configured to enable a tuning lock on the frequency where the signal is found. As another example, the second device 310 can be configured to tune to a default frequency, such as the first frequency, in response to the interference.

Figure 4B:
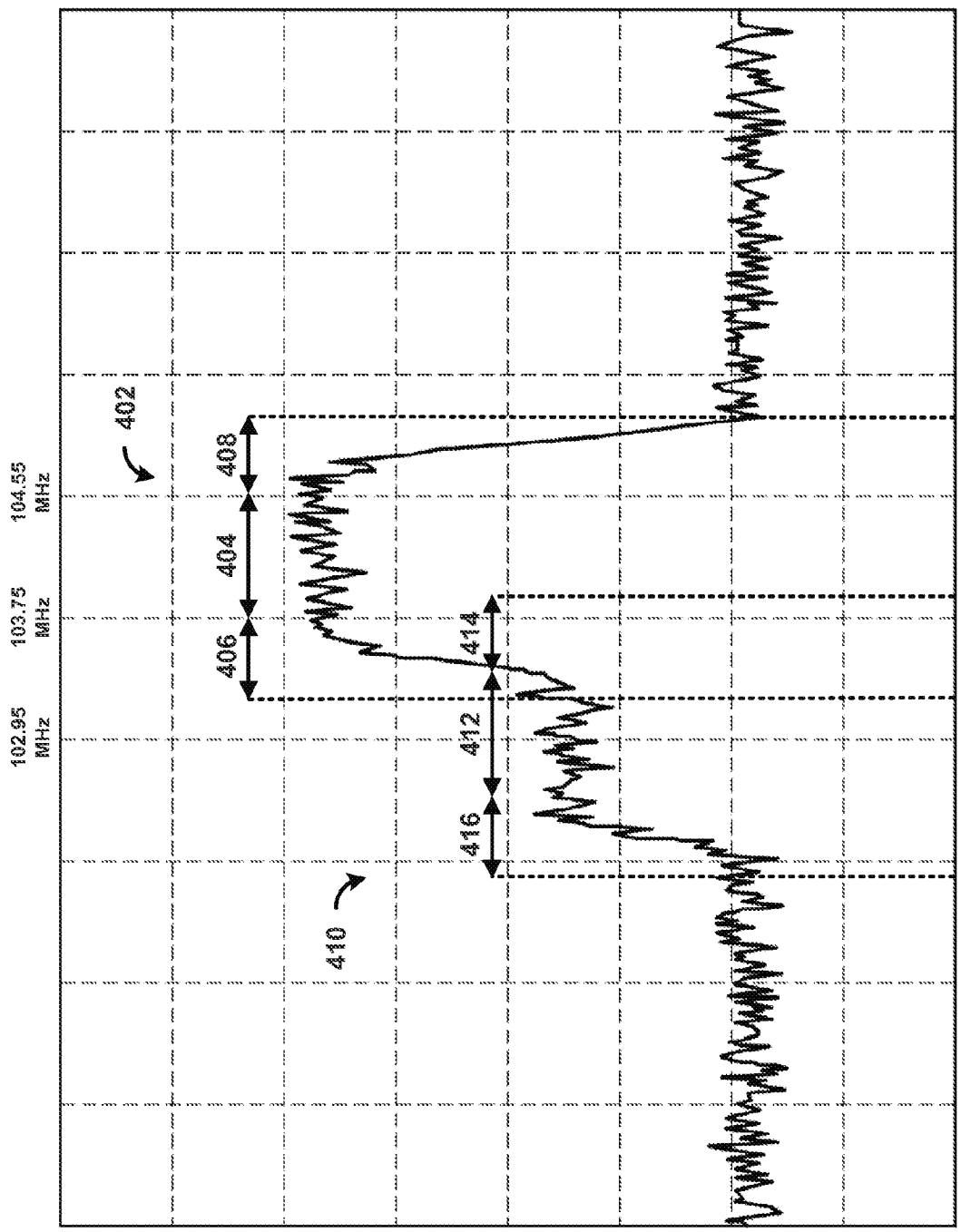
FIG. 4B is a graph illustrating an example signals provided to a device.

FIGS. 4A and 4B are graphs illustrating signals. For example, the graphs can be graphs generated and/or displayed by signal processing or analysis device, such as an oscilloscope. FIGS. 4A-4B are shown using the same scale. The vertical axis can show signal strength. For example, the vertical axis can be in units of decibels relative to one millivolt (dBmV). In one aspect, the graph can have a reference level of 27.7 dBmV indicative of the top of the signals on the graph. The horizontal axis can show frequency. For example, the horizontal axis can be in units of megahertz (MHz). The graph can be centered at 103.75 MHz and have a span (e.g., from the left side of the graph to the right side of the graph) of 8 MHz. The graph can be provided in a logarithmic scale.

FIG. 4A is a graph illustrating an example first signal 402 provided to a device. In one aspect, the first signal 402 can be an out-of-band signal. For example, the first signal 402 can be provided at a range of frequencies. For example, the first signal 402 can be centered at 104.20 MHz. In one aspect, the first signal 402 can comprise a main lobe 404. For example, the main lobe 404 can be approximately 1.5 MHz in width. In another aspect, the first signal 402 can comprise a first side lobe 406 and a second side lobe 408. Dotted lines (e.g., smaller dots indicate an outer boundary) and horizontal arrows indicate approximate boundaries for the side lobes. For example, the main lobe 404 can end and the first side lobe 406 can begin at approximately 103.75 MHz.

FIG. 4B is a graph illustrating an example first signal 402 and second signal 410 provided to a device. For example, the first signal 402 can be the first signal shown in FIG. 4A. The first signal 402 can be centered at 104.20 MHz. FIG. 4B also shows a second signal 410. The second signal 410 can provide interference to the first signal 402. For example, the second signal 410 can be provided at (e.g., centered at) 103.00 MHz. The second signal 410 can comprise a main lobe 412 centered at 103.00 MHz. The second signal 410 can also comprise a first side lobe 414 and a second side lobe 416. In one aspect, the first side lobe 414 of the second signal 410 can be provided at one or more of the same frequencies at which the first side lobe 406 of the first signal 402 is provided. The first side lobe 414 of the second signal 410 can provide interference to the first side lobe 406 of the first signal 402. In one aspect, the second signal 410 can be provided at a lower power level (e.g., amplitude) than the first signal 402. In some scenarios, a device can be incorrectly or undesirably locked onto the first side lobe 406 of the first signal 402 before the second signal 410 is provided. For example, the device can enable a tuning lock at 103.75 MHz. After the second signal 410 is provided, the device is caused to release or otherwise lose or disable the tuning lock to 103.75 MHz because of interference provided by the second signal 410. However, if other devices are tuned to 104.20 MHz (e.g., the center of the main lobe 404 of the first signal), these devices will not receive enough interference to be caused to release tuning lock on the first signal 402 at 104.20 MHz.

Figure 5A:
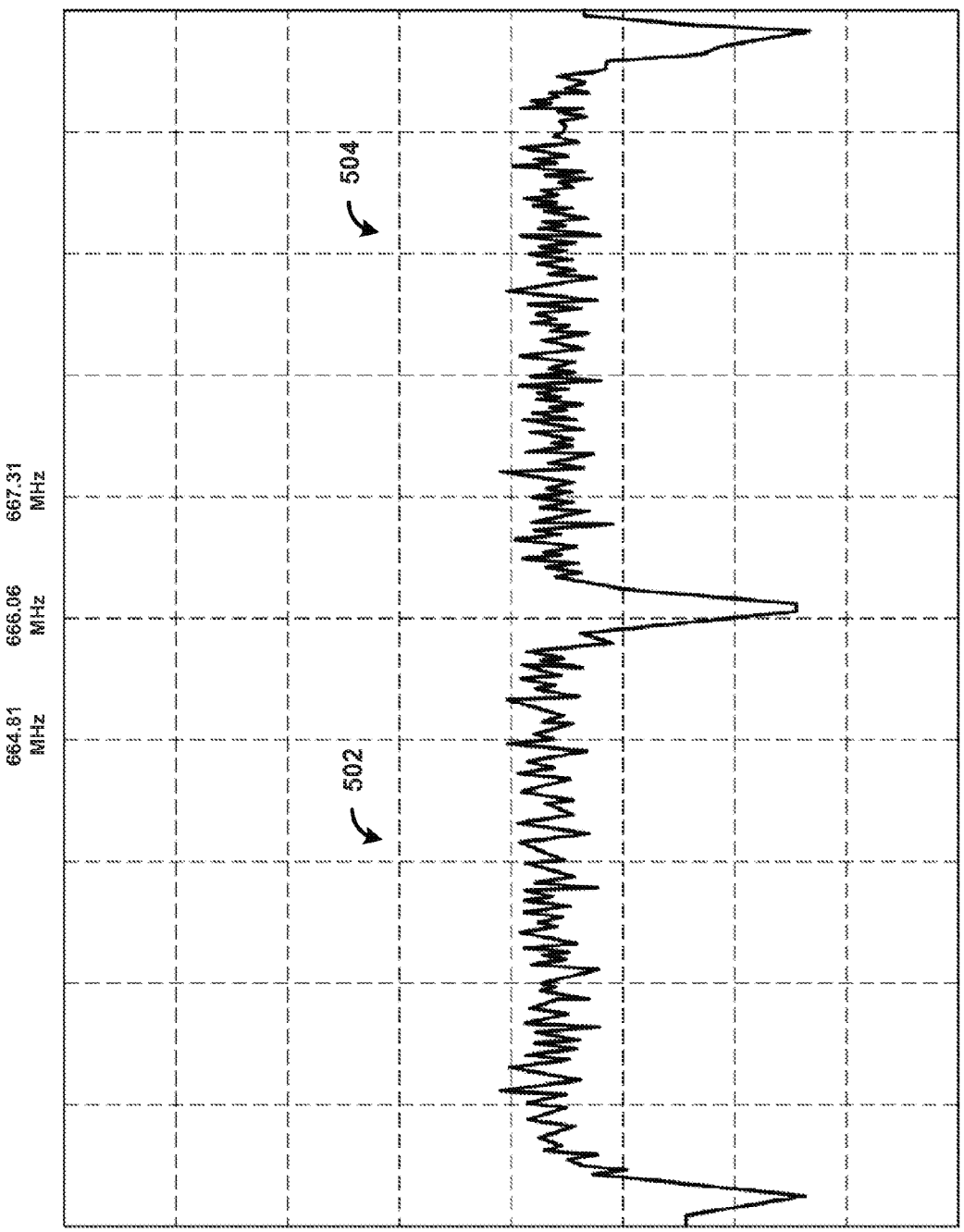
FIG. 5A is a graph illustrating an example signals provided to a device.
Figure 5B:
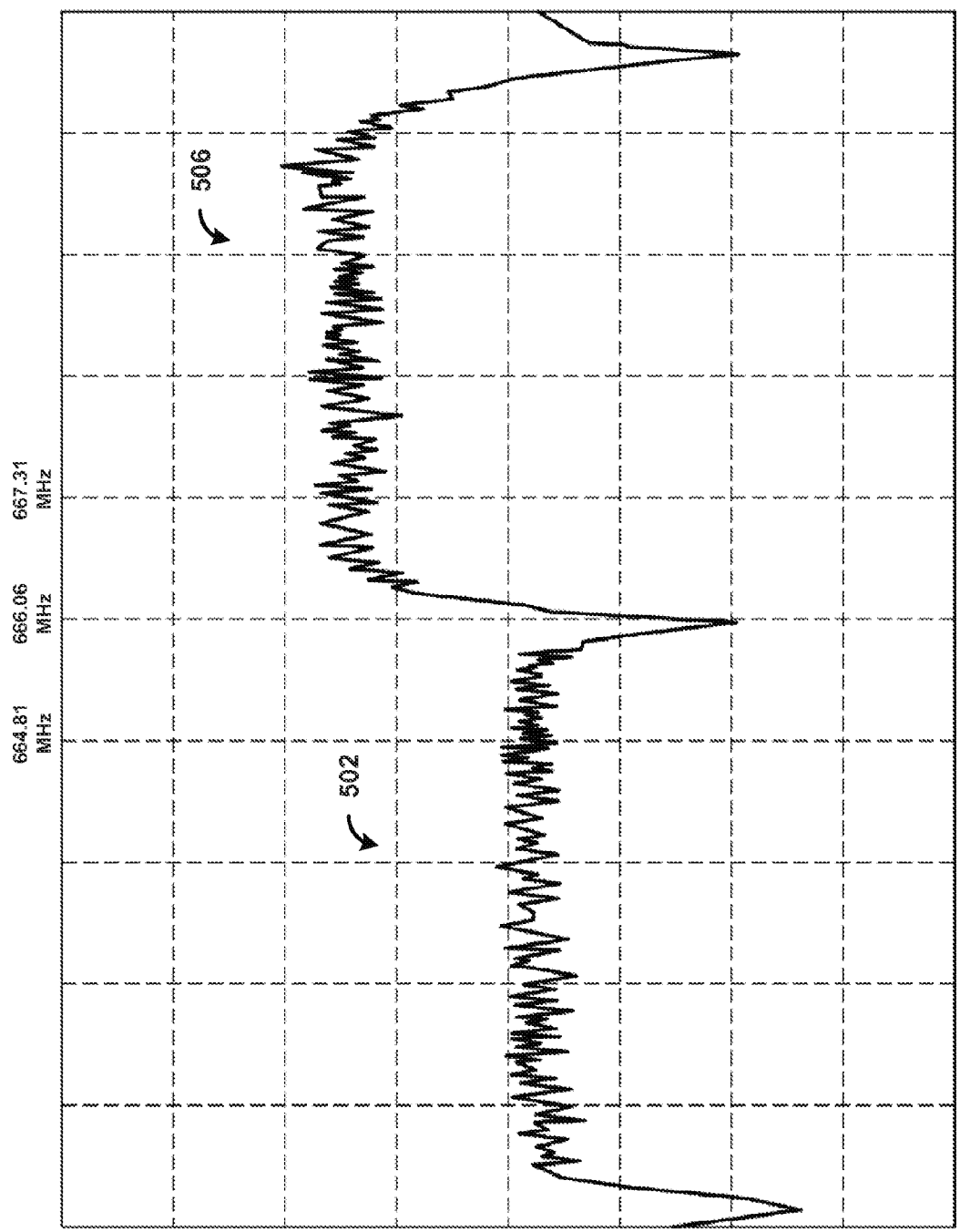
FIG. 5B is a graph illustrating an example interference signal.
Figure 5C:
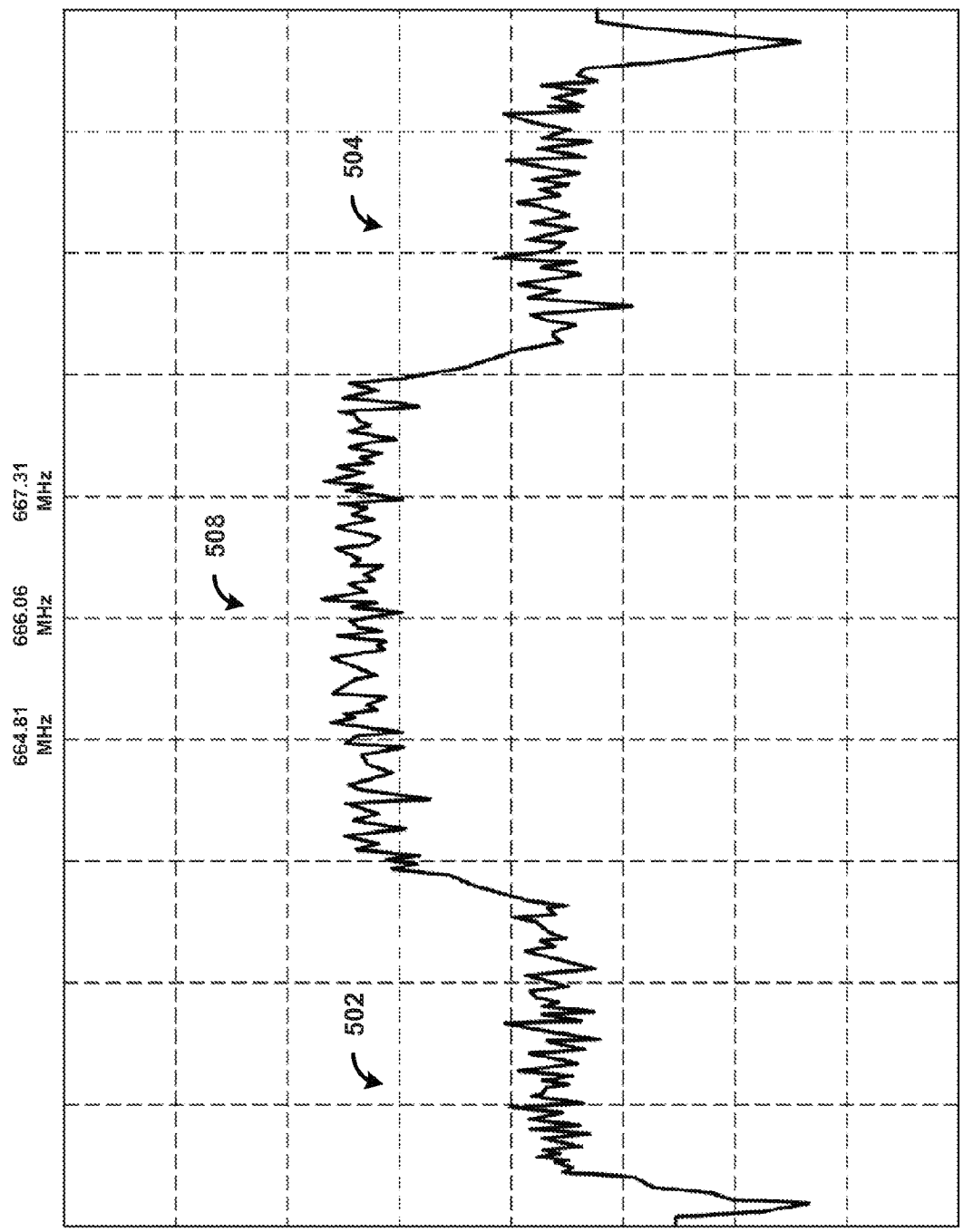
FIG. 5C is a graph illustrating an example interference signal.

FIGS. 5A-5C are graphs illustrating example signals. In one aspect, the signals can be in-band signals. For example, the signals can be provided as channels in a content access or provision network. FIGS. 5A-5C are all shown using the same scale. In one aspect, the graphs can be generated by, displayed on, or provided by a device, such as an oscilloscope. The vertical axis can show signal strength. For example, the vertical axis can be in units of decibels relative to one millivolt (dBmV). In one aspect, the graph can have a reference level of 44.4 dBmV indicative of the top of the signals of the graph. The horizontal axis can show frequency. For example, the horizontal axis can be in units of megahertz (MHz). The graph is centered at 666.06 MHz and have a span (e.g., from the left side of the graph to the right side of the graph) of 12.5 Mhz. The graph can be provided in a logarithmic scale.

FIG. 5A is a graph illustrating an example first signal 502 and second signal 504.

In one aspect, the first signal 502 and second signal 504 can comprise digital signals provided in an in-band channel. For example, the first signal 502 and second signal 504 can be 6 MHz wide signals. As another example, the first signal 502 and second signal 504 can be data carrying signals, such as signals providing video, audio, and/or control data. As a further example, the first signal 502 and second signal 504 can be signals provided in channels according to the standards of the Electronic Industries Association (EIA). For example, the first signal 502 can be provided within EIA channel 102 (e.g., 660 MHz-666 MHz). The second signal 504 can be provided within EIA channel 103 (e.g., 666 MHz-672 MHz).

FIG. 5B is a graph illustrating an example third signal 506 provided as interference to the first signal 502 and/or second signal 504. For example, the third signal 506 can be provided within (e.g., centered at) EIA channel 103. In one aspect, the third signal 506 can be generated and provided by a device controlled by a network operator and/or service provider. The third signal 506 can interfere with the second signal 504. For example, the third signal 506 can be provided such that a device, such as a gateway, display device, or set-top box, is unable to lock on or property tune to the second signal 504. For example, the third signal 506 can be provided with a higher signal strength than the second signal 504.

FIG. 5C is a graph illustrating an example fourth signal 508 provided as interference to the first signal 502 and second signal 504. In one aspect, the fourth signal 508 can be provided by a service provider, such as a network operator. The fourth signal can be generated and/or provided from various locations, such as from a headend, edge device, gateway (e.g., remote or local), and/or other similar remote and/or local network locations. The fourth signal 508 can be provided at a higher signal strength than the first signal 502 and/or second signal 504. As an example, the fourth signal 508 can be provided at a frequency between the center of the first signal 502 and the center of the second signal 504. In one aspect, the third signal 506 can be provided such that a device, such as a set-top box, is unable to lock on or otherwise tune to the first signal 502 and/or second signal 504. For example, the fourth signal 508 can be provided at 666 MHz to interfere with at least a portion of a first signal 502 provided within EIA channel 102 and at least a portion of a second signal 504 provided within EIA channel 103.

Figure 6:
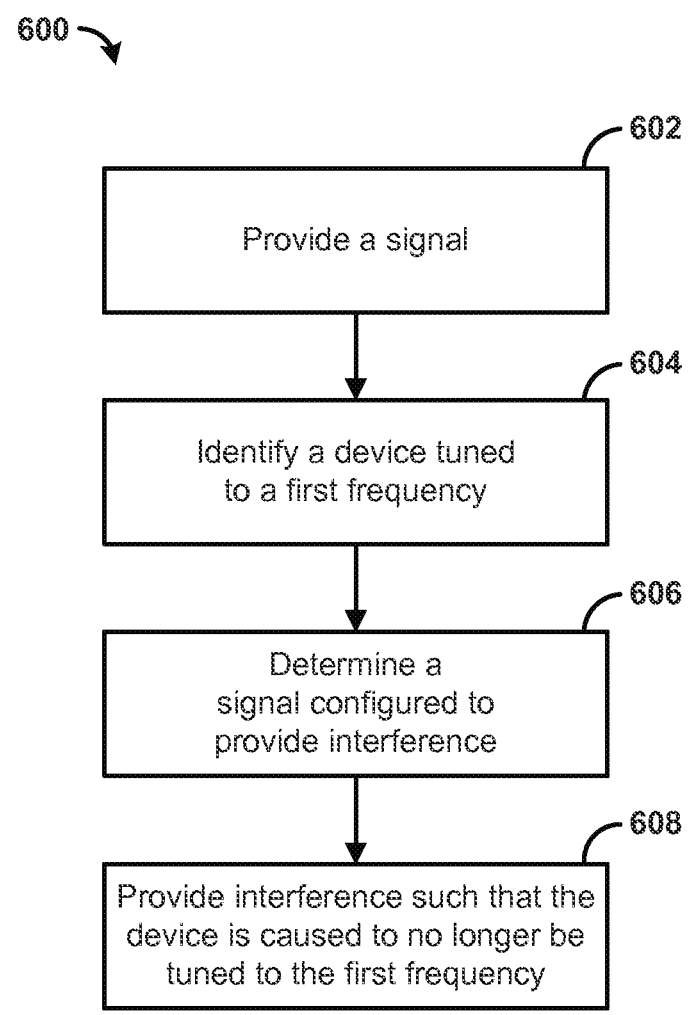
FIG. 6 is a flowchart illustrating an example method for providing signals to a device.

FIG. 6 is a flowchart illustrating an example method 600 for configuring a device, and/or generating or providing signals to a device. In step 602, a data signal can be provided. In one aspect, the data signal can be provided with other signals. For example, a variety of signals can be provided at various frequencies (e.g., range of frequencies).

As an illustration, various portions of a signal can be provided within a range of frequencies. For example, a signal can comprise a main lobe and/or more side lobes. The main lobe can be provided with a different frequency range than the side lobes (e.g., which comprise the edges of the signal). In some scenarios, portions of signals can be provided within the same frequency range as portions of other signals. As a further example, a first signal can be provided (e.g., at least in part, or centered at) at a first frequency, a second signal can be provided (e.g., at least in part, and/or centered) at a second frequency, a third signal can be provided (e.g., at least in part, and/or centered) at a third frequency, and the like. For example, the second signal can comprise the data signal. The data signal (e.g., a portion thereof) can be provided (e.g., centered) at the second frequency to the device. In one aspect, a side lobe of the data signal and/or side lobe of the second signal can be provided at the first frequency (e.g., thereby overlapping a portion of the first signal). In one aspect, the device can be tuned to the side lobe of the second signal and/or side lobe of data signal provided at the first frequency. For example, side lobe of the data signal and/or side lobe of the second signal can be provided at the first frequency such that the device is tuned to the side lobe of the second signal and/or side lobe of data signal provided at the first frequency In one aspect, the device can be a network device, such as a cable modem, a wireless modem, optical termination point, gateway, and the like. In another aspect, the device can comprise a set-top box, a television, a digital receiver, a laptop, a portable device, a tablet device, a mobile device, and/or other computing device. In one aspect, the data signal can comprise content, such as audio, video, text, images, and the like. For example, the data signal can be an in-band signal. The data signal can also comprise information provided by a service provider to the device, such as control information, metadata related to content, electronic program guide information, and the like. For example, the data signal can be an out-of-band signal.

In step 604, a device tuned to a first frequency can be identified. In one aspect, the first frequency is an out-of-band frequency, an in-band frequency, and/or the like. As an example, responsiveness of the device to a second signal at a second frequency can be determined. As another example, whether the device has a tuning lock on the first frequency can be determined. The device can be configured to scan for a signal at a plurality of frequencies. When the device determines that a signal is provided at a particular frequency, the device can stay tuned (e.g., enable a tuning "lock" mode) to the particular frequency. In some instances, the device can incorrectly lock at a frequency. For example, the device can detect a side lobe at a first frequency of the second signal centered at the second frequency. If the device incorrectly enables a tuning lock on the first frequency, then the device may be unable to decode and respond to information provided in the second signal.

In step 606, a signal configured to provide interference can be determined. For example, a first signal configured to provide interference at a first frequency can be determined. By way of explanation, it can be desirable to provide interference at the first frequency to cause the device to lose tuning, tune to another frequency, release a frequency, and/or other similar purpose. The device may be incorrectly or undesirably tuned (e.g., locked on) to a signal or portion thereof such that the device is unable to be communicated with and/or controlled. For example, a third frequency at which to provide the first signal can be selected such that the device is caused to no longer be tuned to the first frequency.

In one aspect, the interference at the first frequency can comprise a side lobe of the first signal configured to interfere with a side lobe of the second signal without disrupting data transmission at the second frequency.

In step 608, interference can be provided to the device. In one aspect, the signal configured to provide interference can be provided. For example, the first signal can be provided to the device such that the device is caused to no longer be tuned to the first frequency. For example, the first signal can be provided to the device at the third frequency. For example, the first signal can be centered at the third frequency. The third frequency can be selected such that the first signal provides the interference at the first frequency in an amount sufficient to cause the device to no longer be tuned to the first frequency. As another example, the first signal can be provided to the device such that the interference causes the device to enter a signal detection mode configured to search one or more frequencies for a data carrying signal. As an illustration, the first frequency can be 103.75 MHz. The second frequency can be 104.20 MHz. The third frequency can be 103.00 MHz. In one aspect, the first signal can be provided on a radio frequency (RF) plant on which the second signal is provided. For example, the first signal can be provided to an RF combiner for delivery to the device.

Figure 7:
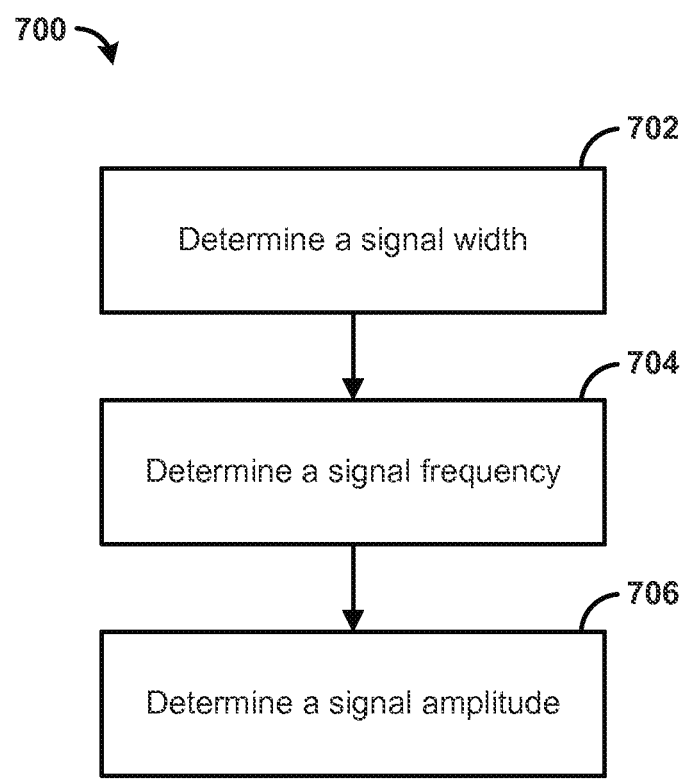
FIG. 7 is a flowchart illustrating another example method for providing signals to a device.

FIG. 7 is a flowchart illustrating another example method 700 for configuring a device, and/or generating or providing signals to a device. In one aspect, the method 700 can be configured to implement step 606 of the method 600. For example, the method 700 can be configured to generate an interference signal. In one aspect, the method 700 can be based on a first signal. For example, the method 700 can be configured to determine a second signal configured to provide interference to the first signal.

In step 702, a signal width can be determined. For example, signal width can be selected for the second signal. In one aspect, the signal width can be determined based on a signal width of a first signal provided to a device. For example, the signal width can be the same as the signal width of the first signal. As another example, the signal width can be the signal width of the first signal multiplied by a factor (e.g., 0.5, 1.5, 2, 3).

In step 704, a frequency can be determined. For example, the frequency can be selected for the second signal. The frequency can be based on a frequency of the first signal. For example, the frequency can be offset from the frequency of the first signal. As an illustration, the frequency can be offset by half of the signal width of the first signal. As another illustration, the frequency can be offset from a first frequency by a predetermined factor (0.3, 0.4, 0.5, 0.6, 0.7, 0.8, 0.9, 1, 1.5, 2) multiplied by the signal width of the first signal.

In step 706, a signal amplitude can be determined. For example, the signal amplitude can be selected for the second signal. In one aspect, the signal amplitude can be based on an amplitude of the first signal. For example, the amplitude of the first signal can be the same or similar to the amplitude of the first signal.

Figure 8:
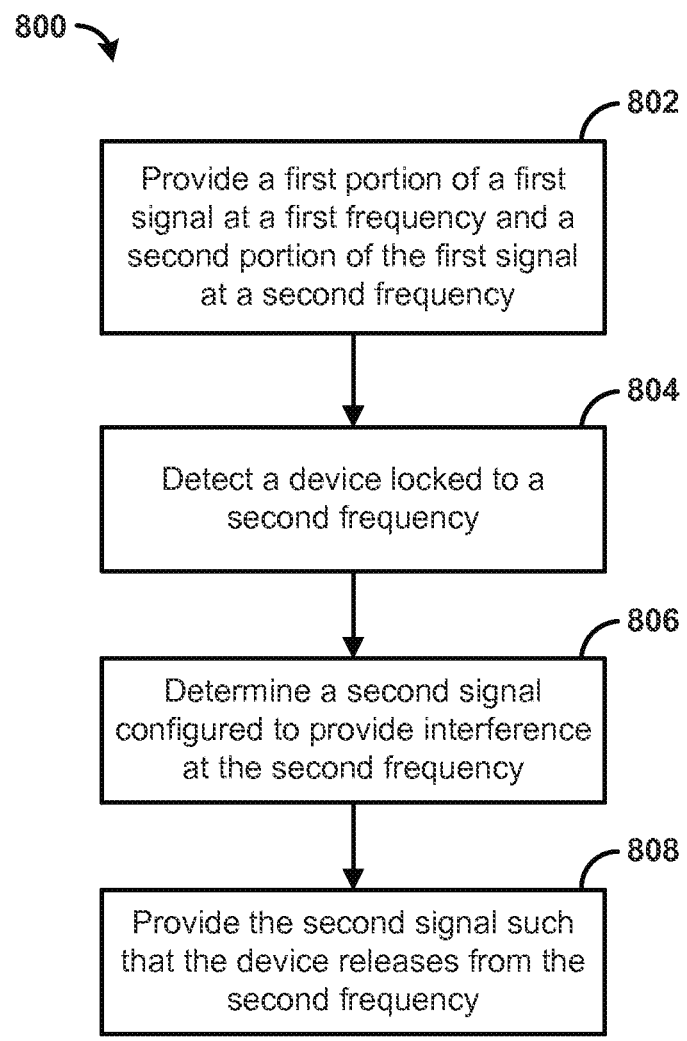
FIG. 8 is a flowchart illustrating another example method for providing signals to a device.

FIG. 8 is a flowchart illustrating another example method 800 for generating signals to and/or configuring a device). In step 802, a first portion (e.g., main lobe) of a first signal can be provided (e.g., centered) at a first frequency. In one aspect, a second portion of the first signal can be provided at a second frequency. For example, the second portion of the first signal provided at the second frequency can comprise a side lobe of the first signal. In one aspect, the first signal can comprise a data signal. In another aspect, the first frequency can comprise an out-of-band frequency, an in-band frequency, and/or the like. In one aspect, the data signal can comprise content, such as audio, video, text, images, and the like. For example, the data signal can be an in-band signal. The data signal can also comprise information provided by a service provider to a device, such as control information, metadata related to content, electronic program guide information, and the like. For example, the data signal can be an out-of-band signal or an in-band signal.

In step 804, a device locked to the second frequency can be detected. For example, responsiveness of the device to the first signal at the first frequency can be determined. As another example, whether the device has a tuning lock on the second frequency can be determined. In one aspect, the device can be a network device, such as a cable or optical modem, a wireless modem, and the like. In another aspect, the device can comprise a set-top box, a television, a digital receiver, a laptop, a portable device, a tablet device, a mobile device, and/or other computing device. In one aspect, the device can be configured to scan for a signal at a plurality of frequencies. When the device determines that a signal is provided at a particular frequency, the device can stay tuned (e.g., enable a tuning "lock" mode) to the particular frequency. In some instances, the device can incorrectly lock at a frequency. For example, the device can detect a side lobe of the first signal at a second frequency. If the device incorrectly enables a tuning lock on the second frequency, then the device may be unable to decode and respond to information provided in the first signal.

In step 806, a second signal configured to provide interference at the second frequency can be determined. For example, a third frequency at which to provide the second signal can be selected such that the device releases the lock from, or can no longer tune to, the second frequency. As another example, the second signal can be determined such that a side lobe of the second signal is provided at the second frequency. The side lobe of the first signal can be provided at the second frequency. In one aspect, the side lobe of the second signal can be configured to interfere with the side lobe of the first signal without disrupting data transmission at the first frequency. In one aspect, the device can be tuned to the side lobe of the first signal.

In step 808, the second signal can be provided such that the device releases the lock from, or can no longer tune to, the second frequency. For example, the second signal can be provided to the device at the third frequency. As a further example, the second signal can be centered at the third frequency. The third frequency can be selected such that the second signal provides the interference at the second frequency in an amount sufficient to cause the device to release the lock from the second frequency. As another example, the second signal can be provided to the device such that the interference causes the device to enter a signal detection mode configured to search one or more frequencies for a data carrying signal. As an illustration, the first frequency can be 104.20 MHz. The second frequency can be 103.75 MHz. The third frequency can be 103.00 MHz. In one aspect, the second signal can be provided on a radio frequency (RF) plant on which the first signal is provided. For example, the second signal can be provided to an RF combiner for delivery to the device.

FIG. 9 is a flowchart illustrating yet another example method 900 for generating or providing signals to and/or configuring a device. In step 902, a first signal can be provided at a first frequency. For example, the first signal can be centered at the first frequency. In one aspect, a portion of the first signal can be provided at a second frequency. In one aspect, the first signal can comprise a data signal. The first frequency can comprise an out-of-band frequency, an in-band frequency, and/or the like. In one aspect, the data signal can comprise content, such as audio, video, text, images, and the like. For example, the data signal can be an in-band signal. The data signal can also comprise information provided by a service provider to a device, such as control information, metadata related to content, interactive information (e.g., data, signals or triggers), electronic program guide information, and the like. For example, the data signal can be an out-of-band signal.

In step 904, a device tuned to the second frequency can be identified. For example, responsiveness of the device to the first signal at the first frequency can be determined. As another example, whether the device has a tuning lock on the second frequency can be determined. In one aspect, the device can be a network device, such as a modem, and the like. In another aspect, the device can comprise a set-top box, a television, a digital receiver, a laptop, a portable device, a tablet device, a mobile device, and/or other computing device. In one aspect, the device can be configured to scan for a signal at a plurality of frequencies. When the device determines that a signal is provided at a particular frequency, the device can stay tuned (e.g., enable a tuning "lock" mode) to the particular frequency. In some instances, the device can incorrectly lock at a frequency. For example, the device can detect a side lobe of the first signal at a second frequency. If the device incorrectly enables a tuning lock on the second frequency, then the device may be unable to decode and respond to information provided in the first signal.

In step 906, a third frequency at which to provide the second signal can be selected such that the device is caused to tune to the first signal at the first frequency.

In step 908, a second signal can be provided as interference to a device tuned to the second frequency such that the device is caused to tune to the first signal at the first frequency. For example, a side lobe of the second signal can be provided at the second frequency. The device can be tuned to the side lobe of the first signal provided at the first frequency. In one aspect, the side lobe of the second signal can be configured to interfere with the side lobe of the first signal without disrupting data transmission at the first frequency. As another example, the second signal can be provided to the device at the third frequency. The third frequency can be selected such that the second signal provides the interference at the second frequency in an amount sufficient to cause the device to no longer be tuned to the first frequency. As another example, the second signal can be provided to the device such that the interference causes the device to enter a signal detection mode configured to search one or more frequencies for a data carrying signal. As an illustration, the first frequency can be 104.20 MHz. The second frequency can be 103.75 MHz. The third frequency can be 103.00 MHz. In one aspect, the second signal can be provided on a radio frequency (RF) plant on which the first signal is provided. For example, the second signal can be provided to an RF combiner for delivery to the device.

By way of explanation, the present methods and systems can be used to enable an information channel to function properly. The present methods and systems can be used to enable a device to properly tune to a signal in scenarios where the device may be undesirably tuned to a portion of a signal. For example, a device can incorrectly tune to a portion of a signal that is not configured to provide data (e.g., side lobe). The present methods and systems can enable the device to tune to the desired signal without communicating data to instruct the device to tune to the desired signal. The present methods and systems can provide a way to quickly prevent devices from receiving data over a particular signal by providing interference with the signal such that the device is unable to properly display the signal. The present methods and systems can cause devices to tune to desired content instead of content that is undesired (e.g., wrong content, unlicensed content, inappropriate content, distorted content, content provided to the network without permission of the network operator, unrecognizable and/or data that is not able to be properly processed, and/or the like).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   providing a first signal comprising a main portion at a first frequency and a side lobe at a second frequency, wherein the first signal comprises a data signal;
   identifying a device tuned to the side lobe at the second frequency of the first signal;
   determining a signal parameter for generating second signal configured to provide interference at the second frequency; and
   providing the second signal based on the signal parameter to the device such that the device is caused to no longer be tuned to the first frequency, wherein a side lobe of the second signal is configured to interfere with the side lobe at the second frequency of the first signal without disrupting data transmission at the first frequency.

2. The method of claim 1, further comprising determining responsiveness of the device to the first signal at the first frequency.

3. The method of claim 1, wherein determining the signal parameter for generating the second signal configured to provide interference at the second frequency comprises selecting a third frequency at which to provide a main portion of the second signal such that the device is caused to no longer be tuned to the second frequency.

4. The method of claim 3, wherein providing the second signal based on the signal parameter to the device such that the device is caused to no longer be tuned to the second frequency comprises providing the second signal to the device at the third frequency, and wherein the third frequency is selected such that the second signal provides the interference at the second frequency in an amount sufficient to cause the device to no longer be tuned to the second frequency.

5. The method of claim 1, wherein providing the second signal based on the signal parameter to the device comprises providing the second signal to the device such that the interference causes the device to enter a signal detection mode configured to search one or more frequencies for a data carrying signal.

6. A method, comprising:
   providing a first portion of a first signal at a first frequency and a side lobe of the first signal at a second frequency, wherein the first signal comprises a data signal;
   detecting a device locked to the side lobe of the first signal at the second frequency;
   determining a signal parameter for generating a second signal configured to provide interference at the second frequency; and
   providing the second signal based on the signal parameter such that the device releases the lock from the second frequency, wherein a side lobe of the second signal is configured to interfere with the side lobe of the first signal without disrupting data transmission at the first frequency.

7. The method of claim 6, further comprising determining responsiveness of the device to the first signal at the first frequency.

8. The method of claim 6, further comprising determining that the device has a tuning lock on the second frequency.

9. The method of claim 6, wherein determining the signal parameter for generating the second signal comprises determining the signal parameter for the second signal such that the side lobe of the second signal is provided at the second frequency.

10. The method of claim 6, wherein determining the signal parameter for generating the second signal configured to provide interference at the second frequency comprises selecting a third frequency at which to provide a main portion of the second signal such that the device releases the lock from the second frequency.

11. The method of claim 10, wherein providing the second signal based on the signal parameter such that the device releases the lock from the second frequency comprises providing the second signal to the device at the third frequency, and wherein the third frequency is selected such that the second signal provides the interference at the second frequency in an amount sufficient to cause the device to release the lock from the second frequency.

12. A method, comprising:
    providing a first signal at a first frequency, wherein a side lobe of the first signal is provided at a second frequency, wherein the first signal comprises a data signal;
    identifying a device tuned to the side lobe of the first signal at the second frequency instead of the first frequency;
    determining a signal parameter for generating a second signal configured to provide interference at the second frequency; and
    providing, based on the signal parameter, the second signal as interference to the device tuned to the second frequency such that the device is caused to tune to the first signal at the first frequency, wherein a side lobe of the second signal is provided at the second frequency and the side lobe of the second signal is configured to interfere with the side lobe of the first signal without disrupting data transmission at the first frequency.

13. The method of claim 12, wherein identifying the device tuned to the side lobe of the first signal at the second frequency instead of the first frequency comprises determining responsiveness of the device to the first signal at the first frequency.

14. The method of claim 12, further comprising selecting a third frequency at which to provide a main portion of the second signal such that the device is caused to tune to the first signal at the first frequency.

15. The method of claim 14, wherein providing, based on the signal parameter, the second signal as interference to the device tuned to the second frequency such that the device is caused to tune to the first signal at the first frequency comprises providing the second signal to the device at the third frequency, and wherein the third frequency is selected such that the second signal provides the interference at the second frequency in an amount sufficient to cause the device to no longer be tuned to the second frequency.

16. The method of claim 1, wherein the side lobe comprises a portion of the first signal weaker than the main portion.

17. The method of claim 1, wherein the side lobe at the second frequency of the first signal is a portion of the first signal that does not sufficiently carry the data signal for transmission of data.

18. The method of claim 1, wherein the device is a set-top box configured to receive media content by tuning to one or more channels at corresponding frequencies.

19. The method of claim 1, wherein first signal is an out-of-band signal.

20. The method of claim 6, wherein the device is a set-top box configured to receive media content by tuning to one or more channels at corresponding frequencies.

* * * * *

UNITED STATES PATENT AND TRADEMARK OFFICE
CERTIFICATE OF CORRECTION

PATENT NO. : 9,615,052 B2
APPLICATION NO. : 14/282752
DATED : April 4, 2017
INVENTOR(S) : Jason Sydney Giardino It is certified that error appears in the above-identified patent and that said Letters Patent is hereby corrected as shown below:

In the Claims

In Column 21, Line 47, replace "generating second" with -- generating a second --

In Column 21, Line 52, replace "first" with -- second --

In Column 24, Line 13, replace "wherein first" with -- wherein the first --

Signed and Sealed this
Sixth Day of June, 2017

Michelle K. Lee
*Director of the United States Patent and Trademark Office*